United States Patent [19]

Pieper

[11] Patent Number: 4,481,991
[45] Date of Patent: * Nov. 13, 1984

[54] TREAD CONFIGURATION FOR MOTOR VEHICLE TIRES

[75] Inventor: Henner Pieper, Langenhagen, Fed. Rep. of Germany

[73] Assignee: Continental Gummi-Werke Aktiengesellschaft, Hanover, Fed. Rep. of Germany

[*] Notice: The portion of the term of this patent subsequent to May 17, 2000 has been disclaimed.

[21] Appl. No.: 419,797

[22] Filed: Sep. 20, 1982

Related U.S. Application Data

[63] Continuation-in-part of Ser. No. 365,030, Apr. 2, 1982, Pat. No. 4,383,568, which is a continuation-in-part of Ser. No. 177,858, Aug. 14, 1980, abandoned.

[30] Foreign Application Priority Data

Aug. 18, 1979 [DE] Fed. Rep. of Germany ... 7923582[U]
Dec. 19, 1981 [DE] Fed. Rep. of Germany ... 8137115[U]

[51] Int. Cl.$^3$ ............................................. B60C 11/00
[52] U.S. Cl. ............................... 152/209 R; D12/138
[58] Field of Search ....................... 152/209 R, 209 D; D12/138, 136

[56] References Cited

U.S. PATENT DOCUMENTS

| | | | |
|---|---|---|---|
| 3,584,670 | 6/1971 | Verdier | 152/209 R |
| 3,799,231 | 3/1974 | Boileau | 152/209 R |
| 3,998,256 | 12/1976 | Verdier | 152/209 R |
| 4,055,209 | 10/1977 | Senger | 152/209 R |
| 4,217,942 | 8/1980 | Takigawa | 152/209 R |
| 4,221,254 | 9/1980 | Roberts et al. | 152/209 D |
| 4,296,789 | 10/1981 | Roberts et al. | 152/209 R |
| 4,383,568 | 5/1983 | Pieper | 152/209 R |

*Primary Examiner*—Michael Ball
*Attorney, Agent, or Firm*—Becker & Becker, Inc.

[57] ABSTRACT

A tread configuration for motor vehicle tires, especially spare tires, with several peripheral rows of essentially V-shaped blocks, with the points of successive blocks, as seen in the peripheral direction of the tire, alternately pointing in opposite directions transverse to the circumferential or peripheral direction of the tire. Three rows of blocks are provided, and are separated from each other by linearly extending peripheral grooves. The width of the two outer rows correspond essentially to the axial dimension of a block; in the middle row, the successive blocks are laterally displaced or offset with respect to each other in such a way that the width of this middle row is approximately 1.3 to 1.8 times the axial dimension of a block individually. The depth of the slanted or inclined grooves located between successive blocks of the middle row is essentially smaller than the depth of the remaining inclined grooves located between the blocks and of the peripheral grooves located between the rows of blocks. The axial distance of the blocks located in the outer rows is practically equal and that also the axial distance of all blocks located in a center or middle region is practically equal and the axial distance of the blocks in the center or middle region is smaller by approximately 20% to 40% than the axial distance of the blocks located in the outer rows. The depth of the inclined grooves of the center or middle row amounts to approximately ¼ to ⅓ of the depth of the remaining grooves. The width of the inclined grooves in the center region amounts to approximately ½ to ¾ of the width of the peripheral grooves on either side of the center or middle region.

7 Claims, 4 Drawing Figures

TREAD CONFIGURATION FOR MOTOR VEHICLE TIRES

This is a continuation-in-part of co-pending application Ser. No. 365,030-Pieper filed Apr. 2, 1982, now U.S. Pat. No. 4,383,568-Pieper dated May 17, 1983, belonging to the assignee of the present invention, which in turn is a continuation-in-part of then co-pending parent application Ser. No. 177,858-Pieper filed Aug. 14, 1980 (now abandoned).

The present invention relates to a tread configuration for motor vehicle tires, especially spare tires, with serveral peripheral rows of essentially V-shaped blocks, with the points of successive blocks, as seen in the peripheral direction of the tire, alternately pointing in opposite directions transverse to the circumferential or peripheral direction of the tire.

With known tread configurations of this type, the tread is provided with four or five peripheral rows, so that utilization as a normal street profile is possible.

The tread configuration of the present disclosure is characterized primarily by three rows of blocks, which are separated from each other by linearly extending peripheral grooves, whereby the width of the two outer rows under consideration individually corresponds essentially to the axial dimension of a block in each outer row, while with the middle row, the successive blocks in the middle row under consideration individually are laterally displaced or offset relative to each other in such a way that the collective width B of this central row is approximately 1.3 to 1.8 times the transverse (axial) dimension of a block individually.

An object of the present invention is to provide a tire profile having a good gripping capacity which is particularly suitable for space-saving spare tires. Such a profile or configuration makes available an extraordinarily good gripping capability as other good tire characteristics with the utilization thereof on spare tires, which, as well known, must be embodied in a manner to save space and weight. These tire characteristics are obtained with comparatively small profile depths, which in turn are needed to keep the dimensions of the spare tire small.

Previously the tread configurations have the same depth for the peripheral grooves on the one hand and the grooves located between blocks following each other in sequence on the other hand. The practically uniform height of the blocks required thereby can have disadvantages under conditions of special loading of the tires; evidence of wear can appear in the middle region of the tread which can lead to flaws on the tires under extreme loading or abrupt breaking procedures.

Consequently a further object of the present invention is to propose a tread configuration of the foregoing type which assures and makes possible a pneumatic tire capable of withstanding high loads also during abrupt breaking procedures.

This object is fulfilled according to the present invention by having the groove depth in the middle region of the tread or in the central or middle row of the tread made considerably smaller or more nominal than the groove depth on both sides of this middle row. Accordingly the block height of the middle row of blocks is less or smaller than the block height in both side regions of the tread.

Consequently a considerably greater stability and rigidity of the blocks results in the region of the middle of the tread and additionally there results a comparatively thick continuous rubber layer as a protective layer above the carcass.

This object, and other objects and advantages of the present invention will appear more clearly from the following specification in connection with the accompanying drawings, in which.

Figure 1:
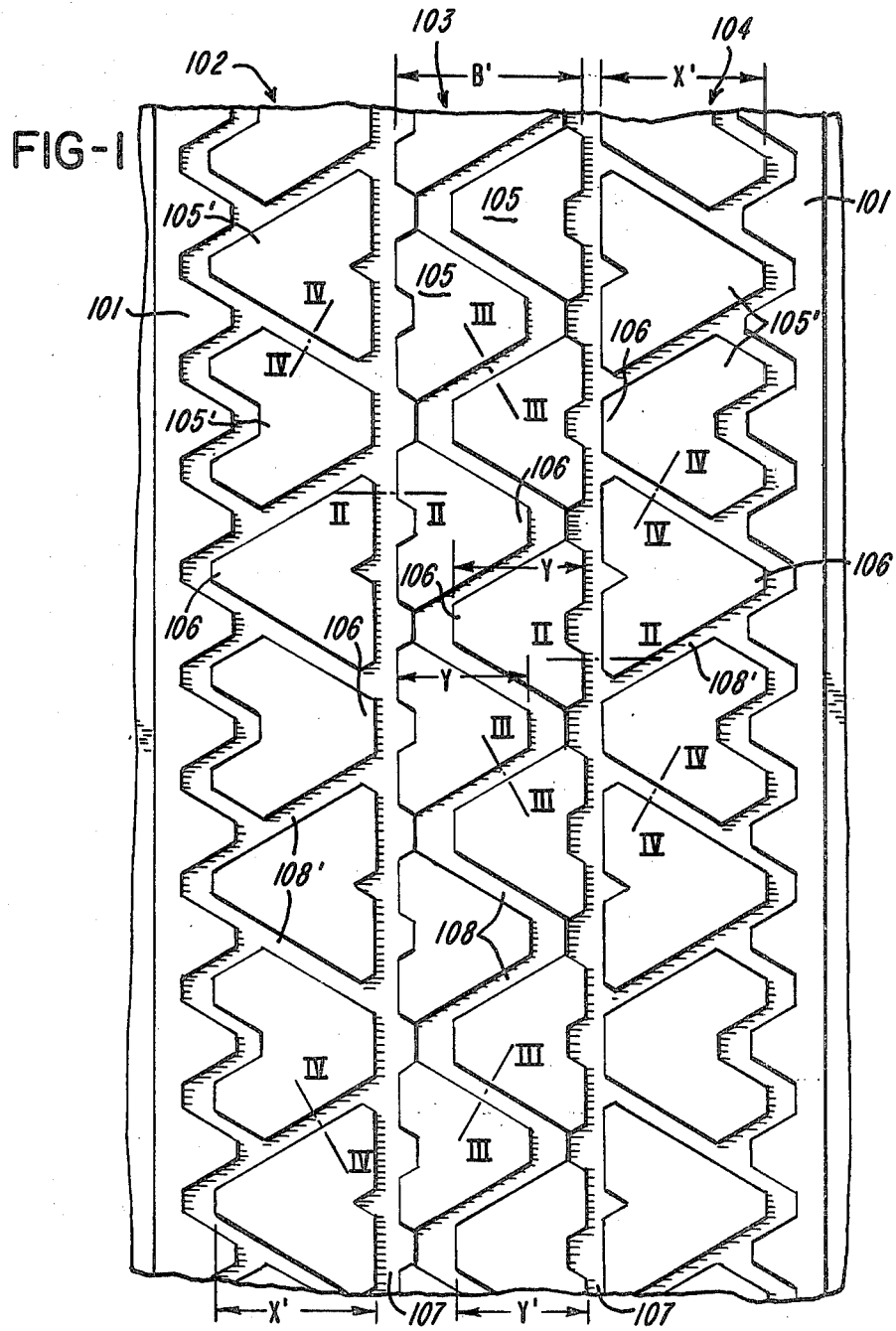
FIG. 1 is a partial plan view of another tread for a spare tire of a passenger motor vehicle in accordance with the present invention.
Figure 1A:
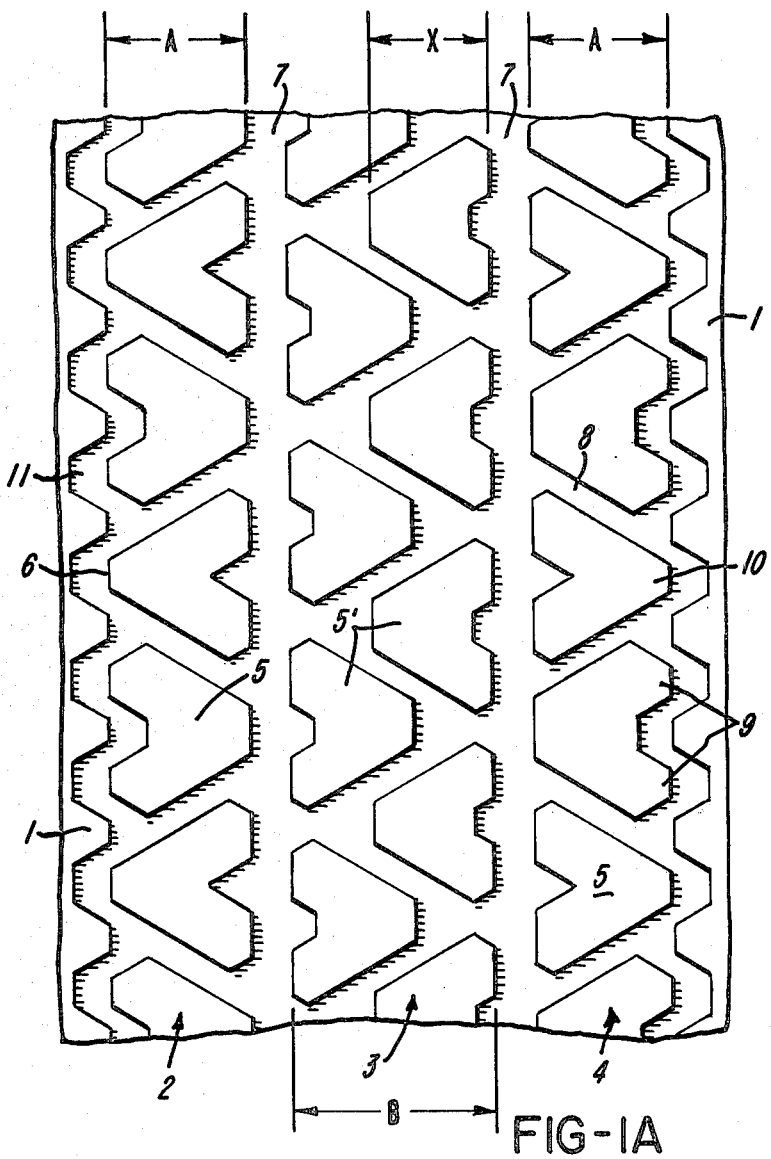
FIG. 1A is a partial plan view of a tread for a spare tire of passenger motor vehicle.

Referring now to the drawing of FIG. 1A in detail, the tread of the tire is limited on both sides by a serrated or notched edge 1, and is further defined by three peripheral rows 2, 3 and 4 respectively comprising essentially V-shaped blocks 5 in such a manner that the tips or points 6 of successive blocks 5 extend in opposite directions, i.e. once toward the left and once toward the right in an alternating pattern (in relation to the peripheral direction of the tire).

The width A of the rows 2 and 4 corresponds to the axial dimension of the blocks 5 in FIG. 1A. The collective width B of the middle row 3, however, is larger, amounting to approximately 1.6 times the (axial) dimension or width X of the individual blocks 5' forming the row 3, whereby a loosening is achieved in the middle region of the tread.

Also, according to FIG. 1A, the width of the two peripheral grooves 7, respectively between the rows 2 and 3, and 3 and 4, is approximately 1.7 times the width of the slanted or inclined grooves 8 arranged between successive individual blocks 5. These widths correspond approximately to the depth of these grooves 7 and 8, or the depths are approximately 0.4 to 0.8 times the width.

The effectiveness in the region of the tread edges is still further increased thereby that the ends 9 and the tips or points 10 of the blocks 5 located in the tread edges are arranged across from (axially in line with) the oppositely located projecting serration edges 11 of the lateral tread boundary.

It is decisive that the measurement of the width B is based upon the axial measurement of the width X of the individual blocks 5' (blocks 5' forming the row 3). Accordingly, there is clearly set forth upon which basis there is to be proceeded when the values of a range between 1.3 to 1.8, or especially the value 1.6 is to be selected.

The drawing of FIG. 1A shows the dimensions "A" for the outer row of blocks 5 as well as the dimension "X" for an inner row of blocks 5'. A ruler with millimeter measurements on it also can be placed on the view of the drawing of FIG. 1A to compare the dimension A, B and/or X and the ratios or ranges as set forth agree substantially with such dimensioning. The distance X is approximately 2.5 millimeters and 1.6 times 2.5 equals approximately 4.00 millimeters according to the scale of the drawing FIG. 1A.

The tread configuration for motor vehicles according to the present disclosure concerns tires for spare wheels used in an emergency and intended to assure travel over a predetermined distance.

Figure 2:
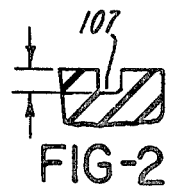
FIG. 2 is a section taken along line II—II in FIG. 1.
Figure 3:
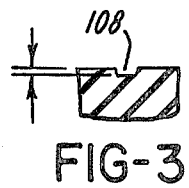
FIG. 3 is a section taken along line III—III in FIG. 1.
Figure 4:
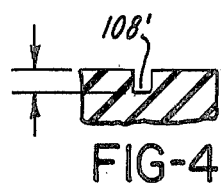
FIG. 4 is a section taken along line IV—IV of FIG. 1.

Referring now in detail to the drawing illustration of FIG. 1 as well as FIGS. 2, 3 and 4 belonging therewith, the tread of the tire on both sides is limited or defined by a serrated or notched edge 101, moreover, however being determined by three rows of blocks 102, 103 and 104, which each consists of in essence V-shaped blocks 105 such that the tips or points 106 of blocks 105 following each other in sequence are arranged in opposite directions, accordingly once toward the left and once toward the right (in relation to the tire peripheral direction).

The width of the rows 102 and 104 of blocks moreover corresponds to the axial distance of the blocks 105. The width B' of the middle row however is kept greater or larger. The width B' of the middle row amounts to approximately 1.6 times the transverse distance of the individual blocks 105 forming the middle row, whereby a loosening is achieved in the middle region of the tread.

The peripheral grooves 107 located between the rows of blocks 102, 103 and 104 are slightly wider than the slanted or inclined grooves 108, which separate the blocks 105 of the rows 102, 103 and 104 from each other.

The slanted or inclined grooves 108 located between the blocks 105 following each other in sequence according to FIG. 3 have a comparatively smaller or more nominal depth if the slanted or inclined grooves 108' of both rows 102 and 104 are taken for comparison purposes. The depth of the slanted or inclined grooves 108 in the region B' is furthermore also smaller or less than the depth of the peripheral grooves 107.

Preferably under these circumstances approximately the following relationships or ratio of values and measurements are selected: the slanted or inclined grooves 108 in both rows of blocks 102 and 104 receive a depth of approximately 4 mm with a width of approximately 2-3 mm; the depth of the slanted or inclined grooves 108 in the region B' in contrast is to amount to only approximately 1 mm with a width of approximately 2-3 mm, while the depth of the peripheral groove 107 is to amount to approximately 4 mm with a width which on the other hand is slightly greater or larger than that of the slanted or inclined grooves 108.

Consequently there results practically over the distance of the width B' accordingly for the tread middle region providing a compact zone through rubber accumulation, piling-up or building-up with blocks 105 which have a smaller height in comparison to the blocks 105' of both rows 102 and 104.

There is also noted that the axial distance X' of all blocks 105' of both rows 102 and 104 is equal; since these blocks are not displaced or offset against each other, there results a width distance for the rows 102 and 104 of blocks which corresponds to the measurement or distance X', but also capable of being slightly greater or larger through a very nominal or small axial displacement and offsetting of the blocks 105' belonging therewith.

The blocks 105 of the row 103 among each other all likewise have the axial distance Y'; the width B' of the row 103 thereby results through the opposite displacement or offsetting of the blocks 105.

The measurement or distance Y' is thereby smaller by 20% to 40% than the axial distance X' of the blocks 105' in the rows 102 and 104. The width B' is thereby so selected that this width B' equals approximately 1.1 to 1.8-times the distance or measurement X'.

In summary, the depth of the slanted or inclined grooves 108 located between sequentially following blocks 105 of the middle row 103 is considerably or essentially smaller than the depth of the remaining or inclined slanted grooves located between the blocks and the peripheral grooves 107 located between the rows of blocks.

The depth of the slanted or inclined grooves 108 of the middle row 103 is approximately $\frac{1}{4}$ to $\frac{1}{3}$ of the depth of the remaining grooves 107, 108.

The width of the slanted or inclined grooves 108 corresponds to approximately $\frac{1}{2}$ to $\frac{3}{4}$ that of the peripheral grooves 107.

The axial distance X' of the blocks 105' located in the rows 102 and 104 is practically equal and also the axial distance Y' of all blocks 105 located in the range or region B' is practically equal and furthermore the axial distance Y' of the blocks located in the region B' is smaller by approximately 20% to 40% than the axial distance X' of the blocks 105 located in the rows 102 and 104.

The depth of the slanted or inclined grooves 108 in the region B' is approximately 1 mm and the width of these slanted or inclined grooves 108 is approximately 2 mm to 3 mm.

The depth of the slanted or inclined grooves 108 of both rows 102 and 104 amounts to approximately 4 mm and the width of these slanted or inclined grooves amounts to approximately 2 mm to 3 mm.

The depth of the peripheral grooves 107 amounts to approximately 4 mm, while the width of these peripheral grooves 107 corresponds practically to this depth measurement.

The present invention is, of course, in no way restricted to the specific disclosure of the specification and drawings, but also encompasses any modifications within the scope of the appended claims.

What is claimed is:

1. A tread configuration for motor vehicle tires, especially spare tires having multiple peripheral rows of essentially V-shaped blocks, each block of which has a point and two ends, with the points of successive blocks in a given row, as seen in the peripheral direction of the tire, alternately pointing in opposite directions transverse to the peripheral direction of the tire, at least three peripheral rows of V-shaped blocks being respectively separated from one another by linearly extending peripheral grooves, with the width of the two axially outer rows of blocks essentially corresponding to the axial dimension of each of said blocks individually in the respective outer row, while the successive blocks of the middle row of blocks are laterally offset relative to each other in such a way that the collective width of said middle row is approximately 1.1 to 1.8 times the axial dimension of each of said blocks individually in the respective middle row and the collective width of the middle row is larger than the width of the outer rows, the improvement therewith comprising that the depth of inclined grooves located between successive blocks of said middle row is essentially considerably less than the depth of the remaining inclined grooves located between the blocks in the outer rows and of the peripheral grooves located between the rows of blocks.

2. A tread configuration according to claim 1, in which the depth of the inclined grooves of said middle row is approximately $\frac{1}{4}$ to $\frac{1}{3}$ of the depth of the remaining grooves.

3. A tread configuration according to claim 1, in which the width of the inclined grooves is approximately ½ to ¾ of the peripheral grooves.

4. A tread configuration according to claim 1, in which the axial distance of the blocks located in the outer rows is practically equal and that also the axial distance of all blocks located in the center region is practically equal and that the axial distance of the blocks in the center region is smaller by approximately 20% to 40% than the axial distance of the blocks located in the outer rows.

5. A tread configuration according to claim 1, in which the depths of the inclined grooves in the center region is approximately 1 mm and the width of these inclined grooves is approximately 2 mm to 3 mm.

6. A tread configuration according to claim 1, in which the depths of the inclined grooves of both outer rows is approximately 4 mm and the width of these inclined grooves is approximately 2 mm to 3 mm.

7. A tread configuration according to claim 1, in which the depth of the peripheral grooves is approximately 4 mm, while the width of these peripheral grooves corresponds practically to this depth measurement of 4 mm.

* * * * *